United States Patent

[11] 3,614,779

[72] Inventors Helmut Sommer
Bethesda;
James Salerno, Rockville, both of Md.
[21] Appl. No. 246,864
[22] Filed Dec. 14, 1962
[45] Patented Oct. 19, 1971
[73] Assignee The United States of America as represented by the Secretary of the Army

[54] RADAR TARGET IDENTIFICATION SYSTEM
1 Claim, 15 Drawing Figs.
[52] U.S. Cl. .................................................. 343/6 R,
343/12 R, 343/17.2 R
[51] Int. Cl. ..................................................... G01s 9/02,
G01s 9/08
[50] Field of Search .......................................... 343/13, 18
B, 17.1, 17.2, 12, 6

[56] References Cited
UNITED STATES PATENTS
3,153,236 10/1964 Rhiner ........................... 343/18 B
3,142,058 7/1964 Rhodes .......................... 343/16
3,079,599 2/1963 Caspers ........................ 343/9

*Primary Examiner*—Malcolm F. Hubler
*Attorneys*—S. J. Rotondi, A. T. Dupont and J. D. Edgerton CLAIM: 1. The method of identifying an object detected by a short range, high-resolution radar having a transmitter which includes means for generating a pulse modulated continuous wave output signal, antenna means connected to said transmitter for radiating the pulse modulated continuous wave output signal generated by said transmitter and for receiving reflected signals of the radiated signal, and a receiver connected to said antenna means, said method comprising the steps of a. combining the reflected signals from said object with a constant phase signal of the same frequency over several pulse periods to produce a signal having the same frequency of the combined signals but which is amplitude modulated due to the variation in phase relation between said reflected signals and said constant phase signal caused by the vibration of said detected object, b. filtering the amplitude modulated signal to detect the modulation signal, and c. audibly reproducing the modulation signal to provide a continuation of the nature of said detected object.

INVENTORS
HELMUT SOMMER
JAMES SALERNO

BY S. J. Rotondi, A. I. Dupont
+ J. P. Edgerton

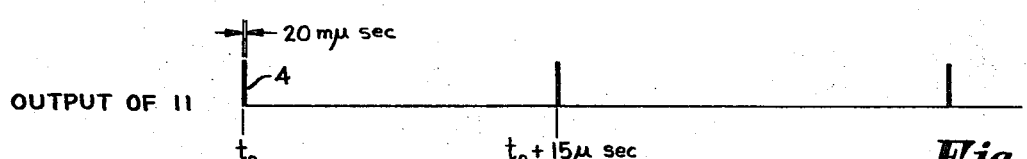
Fig. 2a
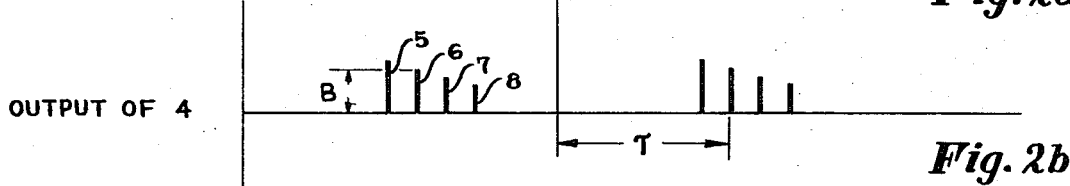
Fig. 2b
Fig. 2c
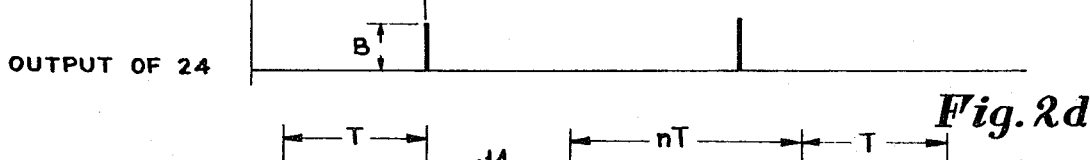
Fig. 2d
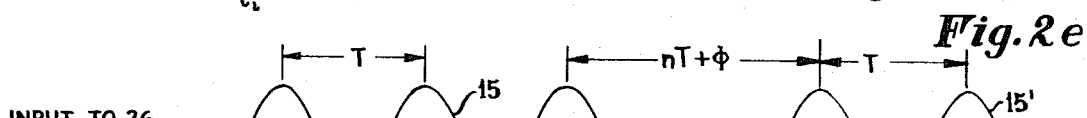
Fig. 2e
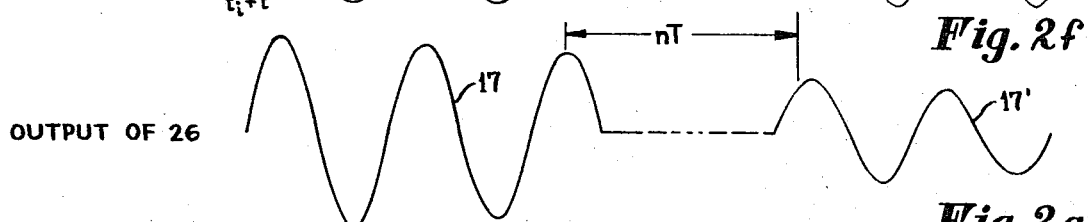
Fig. 2f
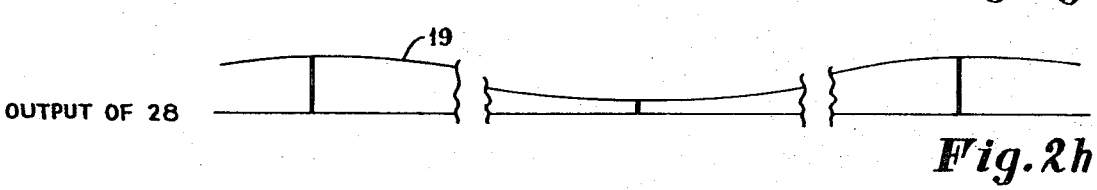
Fig. 2g
Fig. 2h
Fig. 2j

RADAR TARGET IDENTIFICATION SYSTEM

The invention described herein may be manufactured and used by or for the Government of the United States of America for governmental purposes without the payment to me of any royalty thereon.

This invention relates to the field of radar, and more particularly to a system for identifying a detected object.

The great strides in radar technology and hardware made since the Second World War have made possible a great many new applications of radar techniques. The use of pulse modulated radar using extremely short pulses, coupled with high-speed measuring devices, have opened the way to radars capable of use with high resolutions at relatively short ranges. To date, target resolutions of 10 feet have been achieved, i.e., radar targets having a range separation of 10 feet are denoted at the radar receiver as two separate targets, while targets having a smaller range separation might only show up as a single target.

In addition to having high target resolutions, short range radars also have high accuracies, in the range of 10 feet. Because of these accuracy and resolution capabilities, short range radars are well suited for use as individual target range finders. Presently known radar range finding techniques are satisfactory when it is possible for the radar operator to compare the radar display with a visual observation of the field of view. Such comparison enables the operator to identify the object associated with a particular reflected radar pulse in order to determine which of a plurality of radar pulses represents the range to a particular desired target.

However, such a comparison of visual and radar observation is not possible under conditions of poor visibility or where the target is at a relatively large range and is near other reflecting objects so that, while the radar receiver indicates the presence of a plurality of targets, it is difficult to pick out that one of the plurality of signals which represents the target of interest.

It is therefore an object of this invention to provide a system for identifying the nature of the target without resort to a visual observation thereof.

It is another object of this invention to provide a system capable of producing a signal having a characteristic indicative of the nature of the target object.

It is a further object of this invention to provide, a system for producing an amplitude modulated signal having a frequency representative of the nature of the target.

It is still another object of this invention to provide means for producing an amplitude modulated signal having a frequency representative of the frequency of vibration and an amplitude representative of the amplitude of vibration of the target.

According to the present invention, the foregoing and other objects are obtained by utilizing the vibratory characteristics of certain types of objects such as military vehicles. The vibratory motion of such objects affects the transmitted radar pulse in such a way that its phase at the radar receiver is caused to vary at a rate proportional to the frequency of vibration of the target. When this varying phase signal is combined with a constant phase signal of the same frequency over several pulse periods, the result is a signal which varies in amplitude at a rate proportional to the target vibration.

The specific nature of the invention, as well as other objects, uses and advantages thereof, will clearly appear from the following description and from the accompanying drawing, in which:

FIG. 1b is a block diagram of a modification of the transmitter of FIG. 1a.

FIG. 1c is a block diagram of a modification of the target identification means of FIG. 1a.

FIG. 2 is a graph of certain waveforms appearing in the circuit of FIG. 1a.

FIG. 4b is a vector diagram of the reflected radar pulses of the system of FIG. 4a.

Figure 1A:
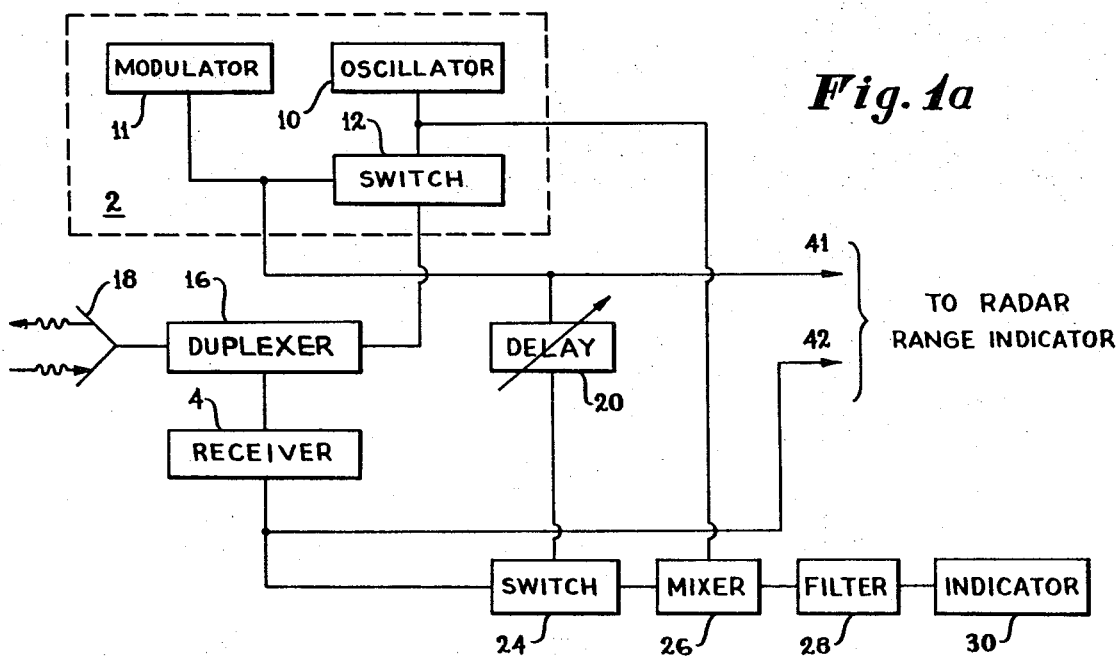
FIG. 1a is a block diagram of one embodiment of this invention.

Turning now to FIG. 1a there is shown a schematic diagram of one embodiment of the present invention. The system shown comprises a radar pulse transmitter 2 having its output connected through a T-R box or duplexer 16 to a transmitting antenna 18. The transmitter 2 is comprised of a pulse modulator 11 which controls an electronic switch 12. A high-frequency oscillator 10 is also connected to the switch 12, and the switch conducts the output of the oscillator 10 to the duplexer 16 during the intervals that the switch 12 is opened by the presence of a pulse output from modulator 11. The modulator 11 may be of any well known type capable of producing high-frequency pulses of short duration. Such a modulator could be of the artificial line type as shown in Terman Electronic and Radio Engineering, McGraw-Hill Publishing Company, 4th edition, page 1,021. The oscillator 10 may be of any well-known type, such as a magnetron, capable of producing radio frequency signals, the higher frequency signals producing better results. The switch 12 may be of any type of vacuum type or semiconductor switch. All of the components of the transmitter are well known in the art and are presently on the market so that it does not appear necessary to describe them in any greater detail. Many combinations of elements are known to be capable of forming a radar pulse transmitter, and any of these combinations would be suitable for the transmitter utilized in the practice of this invention. It is only necessary that the transmitter used be capable of producing pulses of sufficiently high carrier frequency and short duration for use in a short range radar, and that the transmitter have available a continuous source of radio frequency signals for use in other portions of the circuit of FIG. 1a.

The signals received by the duplexer 16 are connected to the input of receiver 4 in such a way so as to transmit reflected signals received at antenna 18 to the input of receiver 4. The antenna 18, duplexer 16, and receiver 4 are all so well known in the art that it does not appear necessary at this point to describe any particular embodiment of these elements in detail. It should be sufficient to note that that these elements may be of any type now on the market which are capable of operating satisfactorily at the desired frequency. In order to determine the range of a target, the outputs of modulator 11 and receiver 4 would be conducted on lines 41 and 42, respectively, to an indicator such as a cathode-ray tube. All of the elements of FIG. 1a which have been thus far described represent well known components of a pulse radar system and function in the circuit of FIG. 1a in their accustomed manner.

The elements of FIG. 1a now to be described represent one combination of elements capable of achieving applicant's novel results. A variable delay circuit 20 has its input connected to the output of the modulator 11, and its output connected to the control input of electronic switch 24. The delay line may be of any well-known type such as a transmission line, or an accurate delay multivibrator. The output of receiver 4 is connected to the information input of switch 24 and the output of the switch 24 is connected as one input of the mixer of adding circuit 26. The other input to the mixer 26 is derived from the output of oscillator 10. The output of mixer 26 is therefore a signal which represents the sum of the output of oscillator 10 and receiver 4 during those intervals when a signal from delay means 20 is impressed on the control input of switch 24. The output of mixer 26 is then conducted to a low pass filter 28 and to an indicator 30. The mixer 26 might be of any well-known type such as the crystal-mixer shown at page 579 of Terman, supra, and the filter 28 could be a simple capacitor filter responsive to the envelope of the output of mixer 26, or it could be such a capacitor combined with an audio frequency amplifier. The indicator 30 would preferably be a pair of earphones since, as will be shown below, the frequency of the envelope of the output of mixer 26 will be in the audio range.

Should this frequency be in the subaudible range, it is only necessary that an audio frequency signal source be provided which will be connected so as to be modulated by the subaudible signal. The resulting signal will be a slowly varying audio wave which can produce easily identified signals on an earphone.

Figure 1B:
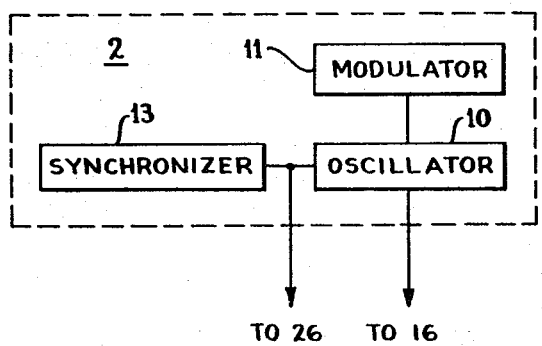

FIG. 1b represents another form which the transmitter 2 can take. In this figure a synchronizing oscillator 13, which may be a locking klystron, is used to stabilize the oscillator 10. The pulse modulator 11 which can be of the same type as that described in connection with the circuit of FIG. 1a, is connected to directly modulate the oscillator 10 so that the output of oscillator 10 is a pulse modulated radio frequency wave. The source of signals for mixer 26 is then derived directly from the output of synchronizer 13.

Figure 1C:
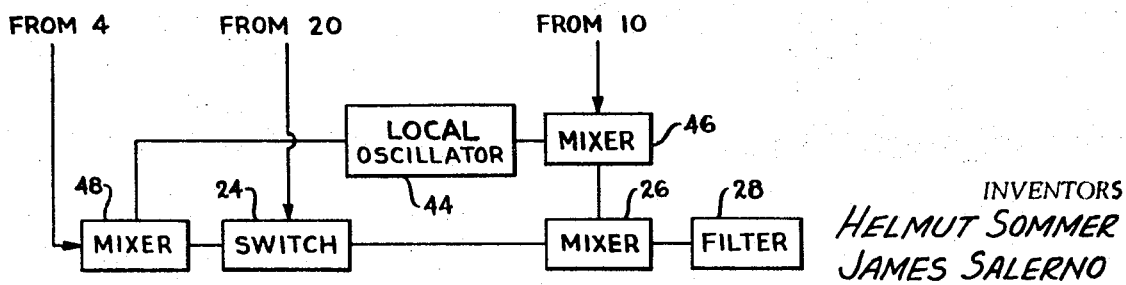

It may be desirable in radar applications to convert the radio frequency signals which are present at the radar transmitter and receiver into intermediate frequency signals. An arrangement for making this conversion is shown in FIG. 1c where a mixer 46 has been inserted in circuit between the output of oscillator 10 and one input of mixer 26 and a second mixer 48 has been inserted in the circuit between receiver 4 and the switch 24. A local oscillator 44 is utilized as the other input to mixers 46 and 48. The resultant output of mixers 46 and 48 are signals having frequencies equal to the difference between the frequency of local oscillator 44 and the frequencies of the inputs from oscillator 10 and receiver 4, respectively. The mixers used for this purpose may be of the same type as that which was indicated to be suitable for mixer 26 of FIG. 1a. A local oscillator of the type illustrated on page 571 of Terman, supra, may be employed as the local oscillator 44. When such mixers are used to modify the outputs of oscillator 10 and receiver 4, the mixer 27 may be of the vacuum tube type such as that shown on page 571 of Terman, supra.

FIG. 2 contains a series of curves of voltage versus time for signals appearing at various points in the circuit of FIG. 1. FIGS. 2a through 2d are drawn to the same time scale, FIGS. 2e to 2g are drawn to an expanded time scale, FIG. 2h represents a series of relatively widely separated time segments, each of which segments is drawn to the same time scale as that of FIG. 2a, and FIG. 2j has a greatly compressed time scale with respect to FIG. 2a. The waveforms of FIG. 2 will be described in more detail in connection with the description of the operation of the circuit of FIG. 1.

Figure 3:
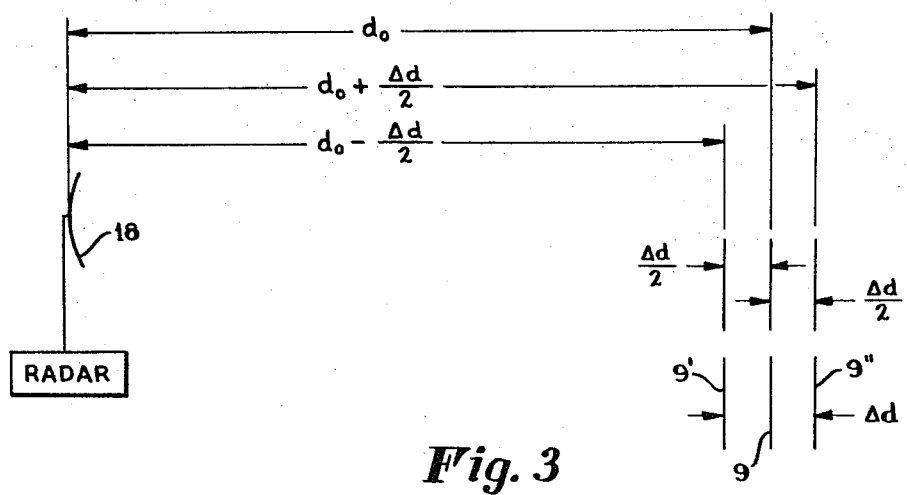
FIG. 3 is a partly pictorial drawing of a radar and target.

FIG. 3 shows a partly pictorial view of a small portion of one surface of an object which might be a radar target. The plane of FIG. 3 is parallel to a line extending from the radar system to the object. When the object in question is a military vehicle, such as a tank, and when this vehicle has its motor running, the surfaces of the vehicle will have a small vibration. FIG. 3 shows the position of the surface 9 and 9' when its vibration brings it closest to the radar system. The front plane of this surface is at that time a distance $\Delta d/2$ to the left of a stationary reference position $d_0$. When the surface is at the midpoint of its vibration, the surface 9 is at the stationary reference position $d_0$. When the surface 9 is at the other extreme of its vibration, it is shown as 9'' and is a distance $\Delta d/2$ to the right of the stationary reference position $d_0$. Thus it may be seen that the surface 9 undergoes a total motion due to its vibration of $\Delta d$. It is this vibration experienced by certain types of objects that makes possible the practice of applicant's invention. Therefore, the effect of this vibration on the radar carrier wave will be described here, prior to the discussion of the operation of circuit of FIG. 1. It may be observed that when the surface 9 of FIG. 3 vibrates from one extreme position, 9', to its other extreme position, 9'', that it moves through a total displacement of $\Delta d$ in the direction of travel of a radar wave. Since a wave must ravel in the direction of its propagation until striking surface 9 and then travel back toward the radar receiver, the total distance of travel of a radar beam when it strikes the surface 9 in the position shown at 9'' will be $2\Delta d$ greater than the total travel distance when the surface 9 is in the position shown at 9'. Thus, when the surface 9 is in its nearest position to the radar, i.e., at position 9', a radar pulse traveling from antenna 18 to the surface and back again will traverse a distance equal to $2(d_0-\Delta d/2)$. When the surface is furthest from the radar, i.e., at position 9'', a radar pulse going from the antenna 18 to the surface and back will traverse a distance equal to $2(d_0+\Delta d/2)$.

When an electromagnetic wave is propagated in a uniform medium, its propagation velocity is constant and the phase of a particular point traveling with the wave front differs in phase from a fixed point by an amount proportional to the distance between the wave front and the fixed point. This phase differential is equal to $d/\lambda \times 360°$ where $d$ is equal to the distance separating the two points and $\lambda$ is equal to the wavelength of the wave in the medium. Taking the reference point as the antenna 18 in FIG. 3 and the length of the wave path d as the distance from the antenna 18 to the surface 9 and back to antenna 18, the expression of the total phase shift of the wave with respect to the reference point when the surface 9 is in the position 9', is given by $$\frac{2\left(d_o - \frac{\Delta d}{2}\right)}{\lambda} \times 360°.$$

When the surface 9 is in the position 9'' the phase shift is $$\frac{2\left(d_o + \frac{\Delta d}{2}\right)}{\lambda} \times 360°.$$

Therefore, the carrier wave of the reflected radar pulse at antenna 18 can have a total phase variation equal to $$\frac{2\left(d_o + \frac{\Delta d}{2}\right) - 2\left(d_o - \frac{\Delta d}{2}\right)}{\lambda} \times 360° = \frac{2\Delta d \times 360°}{\lambda}$$

as the surface 9 vibrates from one extreme position 9' to its other extreme position 9''. This phase shift is with reference to a constant frequency carrier wave such as that produced by the oscillator 10 of the system shown in FIG. 1a.

It has been found experimentally that a military vehicle such as a tank will experience a vibration in the range of 2 or 3 millimeters when its main power plant is in operation. At the carrier frequency employed in the short range radars capable of utilizing this invention the wavelength of the carrier wave is in the vicinity of 2.5 centimeters. Substituting these values, in the above formula yields the following representative value of the total phase excursion of the radar carrier wave;

$$\frac{2\Delta d}{2} \times 360° = \frac{2(2 \times 10^{-3}) \times 360°}{2.5 \times 10^{-3}} = \frac{.4}{2.5} \times 360 = 57.6°.$$

As will be discussed below, it is this phase variation which enables the radar operator to detect the frequency of vibration of a particular target, and hence the nature of the target.

The operation of the device of FIG. 1a will now be described with reference to FIGS. 1a and 2. The modulator 11 of FIG. 1a produces a timed series of short pulses. T pulse width is adjusted to secure the desired range resolution. The resolution desired for a military range finder is of the order of 10 feet and therefore requires a pulse width of the order of 20 nsec. (20×10⁻⁹ sec). Range finders are generally required to operate up to ranges of the order of 1 mile, requiring intervals between pulses of the order of 10 or 15 usec. In order to prevent the occurrence of range ambiguities caused by the return of one transmitted pulse after the transmission of a subsequent pulse. The signal produced by modulator 11 is shown in FIG. 2a. The output of modulator 11 is used to control the switch 12 while the output of radio frequency oscillator 10 is used as the controlled input to switch 12. Therefore, the output of switch 12 is a series of pulse modulated high frequency sine waves. The output from switch 12 is then conducted to transmitting antenna 18 through duplexer 16. The reflected signals are transmitted form antenna 18 through duplexer 16 to the receiver 4, where they are suitably amplified. The output of receiver, showing the reflection of a group of targets, is shown in FIG. 2b.

Let us now assume that the radar operator wishes to determine the nature of the target represented by the pulse 6 of FIG. 2b. In order to do this, he adjusts the delay means 20 until the series of pulses occurring at modulator 11 are caused to occur at the output of delay means 20 in time coincidence with the pulses 6. Since the output of delay means 20 controls switch 24, the switch will only be able to pass the pulse 6 for each interval between transmitted pulses. Of course, if only one target is causing reflections, this switch means is not necessary. The output of delay means 20 is shown in FIG. 2c and the output of switch 24 is shown in FIG. 2d. The output of switch 24 is added to, or mixed with, the output of oscillator 10 in mixer 26. It is at the output of mixer 26 where the effect of target vibration, as discussed in connection with FIG. 3, first becomes observable.

In order to understand the effect of target vibration on the output of mixer 26 it is necessary to recall that the transmitted radar pulse is actually a pulse-shaped envelope made up of a train of very high frequency sine waves. The frequency of these waves, as previously noted is of the order of 10 gc. Two isolated segments 14 and 14' of the carrier wave are shown in FIG. 2e. These two segments represent portions of the sine wave produced by the oscillator 10. The oscillator 10 of FIG. 1a may be used as phase reference signal. This characteristic of the output of oscillator 10 is shown in FIG. 2e wherein if the time period between successive peaks of the wave 14 it T, then the time period between some peak of the wave 14 and some peak of the wave 14' will be nT, where n is an integer, and the time period between successive peaks of the wave 14' is also T. FIG. 2f illustrates small portions 15 and 15' of the carrier wave trains of two widely separated received pulses, such as the pulses 6 each received from the same target. The target is vibrating in the manner described in connection with FIG. 3. However, with the extremely short pulses utilized in the radar of this invention, the target will appear to be stationary during any one pulse interval. Therefore, the frequency of the carrier wave for each pulse will be constant and will be equal to the frequency of the output of oscillator 10. This is shown in FIG. 2f wherein the period between any two succeeding positive peaks of the carrier wave train of any received pulse will be equal to T. However, since the target is vibrating, the distance from the transmitter to the target will change over a sufficiently long period of time. The result of this change in the length of the radar signal path will be a shift in phase of the carrier wave 15' of one reflected pulse with reference to the carrier wave 15 of some earlier reflected pulse. This shift in phase is shown in FIG. 2f wherein the time between a positive peak of the carrier wave 15 and a positive peak of the carrier wave 15' is $nT + \Phi$; where n is an integer, T is the period of the carrier wave produced by the oscillator 10, and $\Phi$ is the slight variation in the travel time of the reflected wave caused by the vibratory motion of the target during the interval nT. Thus it may be seen that as a particular target vibrates the carrier wave train of the series that target shift in phase with respect to constant frequency output of the oscillator 10.

As has been noted previously the delay means 20 and the switch 24 of FIG. 1a permit only the received pulses associated with a particular target to be transmitted to an input of mixer 26. Assuming now that thru suitable amplification in the receiver 4 of FIG. 1a, the amplitude of the received signal from the target of interest is made equal to the amplitude of the output of oscillator 10, the signal produced at the output of mixer 26 will be of the form shown in FIG. 1g. The wave 17 represents the sum of the waves 14 and 15, and the wave 17' represents the sum of the signals 14' and 15'. It may be shown that the sum of two sine waves of equal amplitude and frequency is given by the relation $$2 \cos\left(\frac{\phi}{2}\right) \sin\left(wt + \frac{\phi}{2}\right)$$

where w is the frequency of the waves and $\Phi$ is the relative phase shift between them. From this relation it may be seen that the peak amplitude, or the envelope, of the resultant sine wave is proportional to the phase variation between the two waves. This explains why the peak amplitude of the wave 17 of FIG. 2g is greater than that of the wave 17'. The result of this variation in peak amplitude will be a variation in the amplitude of the pulse shaped envelope of the output of the mixer 26. Since the phase difference between the received pulse carrier wave and the reference output of oscillator 10 is controlled by the vibratory motion of the target of interest, the amplitude of the output of filter 28 will vary at a frequency equal to the target vibration frequency. Several widely space segments of the output of filter 28 are shown in FIG. 2h as the wave 19. Several input pulses to the filter 28 are also shown, superimposed on wave 19, to indicate that the amplitude of the wave 19 is directly determined by the amplitudes of the input pulses. FIG. 2j show a continuous wave 19 drawn to a compressed time scale compared with that of FIG. 2h. For targets such as military tanks the frequency of the phase variation caused by the target vibration is in the audio range and may be detected by the operator by an indicator 30, which might consist of a pair of earphones or other listening device. Thus by use of the target identification means herein described, a radar operator can differentiate between a military vehicle and a rock, hill or other natural object which has no vibration, or an object such as a tree which has a very low vibrating frequency.

Because of the difficulty of performing operations on signals of the high frequency utilized for radar carrier waves it is often desirable to reduce these frequencies to a more convenient level. A modification of FIG. 1a for carrying out this frequency shift is shown in FIG. 1c wherein the carrier frequency signals from oscillator 10 and receiver 4 are each combined with the output of local oscillator 44 in mixers 46 and 48, respectively. The outputs of these two mixers are intermediate frequency signals which can be operated on with greater ease. Since the output of local oscillator 44 is of a constant frequency and amplitude, the output difference signal from mixers 46 and 48 will retain all of the identifying characteristics of the inputs from oscillator 10 and receiver 4. The outputs of mixers 46 and 48 would therefore retain all of the phase information of their respective radar inputs, and would produce information at the output of mixer 27 which is similar to that produced at the output of mixer 26 of FIG. 1a.

Figure 4B:
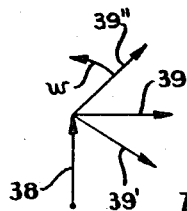
Figure 4A:
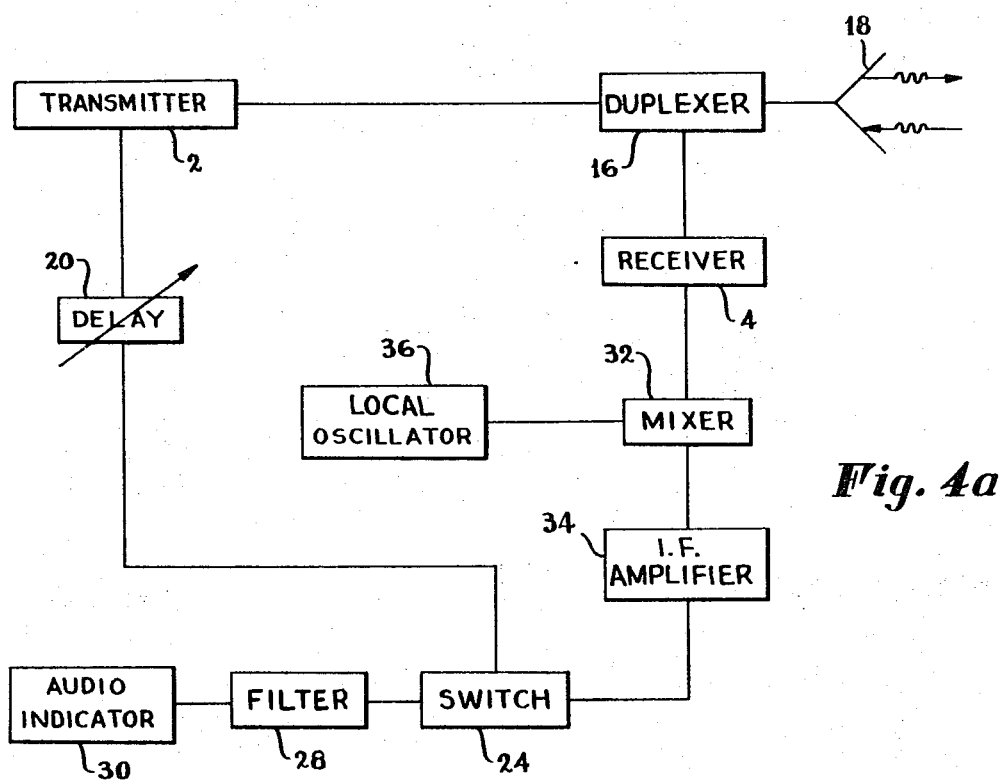
FIG. 4a is a block diagram of a second embodiment of the present invention.

As has been noted above, natural terrain features such as earth and rocks have no detectable vibration. This characteristic may be utilized in the assembly of another embodiment of applicant's invention, such as that shown in FIG. 4a. FIG. 4a shows a target identification system comprising a pulse modulated radar transmitter 2 having its output connected to a transmitting and receiving antenna 18 thru a duplexer 16. The output of the pulse modulator of the transmitter 2 is fed to a variable delay means 20 and the output of the delay means is connected to control an electronic switch 24. Reflected radar signals received at radar antenna 18 are conducted thru duplexer 16 to the input of receiver 4. All of the above recited elements of FIG. 4a are identical with elements bearing the same numbers of FIG. 1a. The output of the receiver 4 of FIG. 4a is combined with the output of a local oscillator 36 in mixer 32 so that the output of this mixer contains a signal component having a frequency equal to the difference in frequencies between the two inputs thereto. This difference frequency component is amplified in the intermediate frequency amplifier 34 and conducted to the information input of switch 24. The local oscillator 36 may be of the same type as the local oscillator 44 of FIG. 1c, the mixer 32 may be of the same type as the mixer 26 of FIG. 1a, and the IF amplifier 34 may be of any well-known type which can be adapted to be responsive only to the component of the mixer output whose frequency is equal to the frequency difference between the mixer inputs. The output of delay means 20 controls switch 24 in the same manner as does the delay means of FIG. 1a, so that only the received pulse for a particular target is transmitted thru switch 24. The signal appearing at the output of switch 24 is conducted to a low pass filter 28 and then to an audio frequency indicator 30. The elements 28 and 30 may be identical with the like numbered elements of FIG. 1a.

In operation, the antenna of the system of FIG. 4a is directed so that a portion of the beam strikes the target of interest and another portion thereof strikes the ground surrounding the target. When this signal is reflected and returned to the antenna 18 it is composed primarily of two components, one from the ground and one from the target. The relation of the phase of these two components is shown in FIG. 4b wherein the vector 38 represents the component of the radar signal reflected form the ground and the vector 39 represents the portion of the radar signal reflected from the target. The vector 38 is treated as the stationary reference vector. If the target vibrates in the manner of the surface 9 of FIG. 3, the result will be that the portion of the radar signal reflected from the target will vary in phase with respect to the portion of the radar signal reflected from the ground. Thus, when the target is in the position 9 of FIg. 3, the portion of the signal reflected from the target might be in the position 39 of FIG. 4b. When the target surface is in the position 9' of FIG. 3 the vector of the portion of the radar signal reflected from the target surface will be in position 39', assuming the direction of rotation of the vector to be counterclockwise. Finally, when the target surface is in the position 9" of FIG. 3, the vector representing the portion of the radar signal reflected from the target surface would be in the position 39" of FIG. 4b. Since, as may be seen from an inspection of FIG. 4b, the vector sum, or peak amplitude, of the two portions of the reflected radar signal change in amplitude at a frequency equal to the frequency of vibration of the target, the target identification signal produced by the system of FIG. 4a will be of the same form as that produced by the system of FIG. 1a.

Inspection of FIG. 4b should make it evident that the radio frequency signal produced by the rotation of the vector 39 with respect to the vector 38 produces a signal having a greater amplitude when the former vector is in the position 39 than when it is in the position 39". In fact, the amplitude of the resulting signal approaches zero as the rotating vector 39 reaches a position where it is in the same direction as the reference vector 38. This would result in a variation in sensitivity of the disclosed devices between the case when the vectors 38 and 39 are perpendicular to each other thus producing high sensitivity and that existing when these vectors are parallel thus producing low sensitivity. This difficulty can be overcome by the provision of a quadrature mixer system which would comprise one of the circuits discussed previously herein, such as that of FIG. 1a, along with a 90° phase shifter connected to the output of the reference oscillator, means for mixing the output of this phase shifter with the signal received from the vibrating target, such as the signal on the output of receiver 4, and means for vectorially combining the output of this mixer with output of the first mixer in the circuit, such as the mixer 26. The result will be a signal having a constant amplitude variation for a given amplitude vibration of the target, regardless of the phase relation between the transmitted signal and the received signal.

It will be apparent that the embodiment shown is only exemplary and that various modifications can be made in construction and arrangement within the scope of the invention as defined in the appended claims.

I claim as my invention:

1. The method of identifying an object detected by a short range, high-resolution radar having a transmitter which includes means for generating a pulse modulated continuous wave output signal, antenna means connected to said transmitter for radiating the pulse modulated continuous wave output signal generated by said transmitter and for receiving reflected signals of the radiated signal, and a receiver connected to said antenna means, said method comprising the steps of
   a. combining the reflected signals from said object with a constant phase signal of the same frequency over several pulse periods to produce a signal having the same frequency of the combined signals but which is amplitude modulated due to the variation in phase relation between said reflected signals and said constant phase signal caused by the vibration of said detected object,
   b. filtering the amplitude modulated signal to detect the modulation signal, and
   c. audibly reproducing the modulation signal to provide a continuous indication of the nature of said detected object.